United States Patent
Ahrens

(10) Patent No.: US 7,229,221 B2
(45) Date of Patent: Jun. 12, 2007

(54) OPTICAL TRANSPONDER WITH PASSIVE HEAT TRANSFER

(75) Inventor: Michael E. Ahrens, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/157,325

(22) Filed: Jun. 20, 2005

(65) Prior Publication Data

US 2006/0285806 A1   Dec. 21, 2006

(51) Int. Cl.
*G02B 6/42* (2006.01)
(52) U.S. Cl. .................................................. 385/92
(58) Field of Classification Search ............. 385/88–94
See application file for complete search history.

(56) References Cited

U.S. PATENT DOCUMENTS

| | | | |
|---|---|---|---|
| 2003/0159772 A1 | 8/2003 | Wolf et al. | |
| 2004/0105633 A1* | 6/2004 | Ishikawa et al. | 385/92 |
| 2004/0252953 A1* | 12/2004 | Crane et al. | 385/92 |
| 2005/0046011 A1 | 3/2005 | Chen et al. | |
| 2005/0084219 A1* | 4/2005 | Catchmark et al. | 385/92 |

FOREIGN PATENT DOCUMENTS

WO PCT/US2006/024037   11/2006

* cited by examiner

*Primary Examiner*—Sarah Song
(74) *Attorney, Agent, or Firm*—Blakely, Sokoloff, Taylor & Zafman LLP

(57) ABSTRACT

According to embodiments of the present invention, an optical transponder module generates heat when operating and at least a copper heat wick and/or a copper block are disposed in the module body to perform passive transfer of heat from inside the optical transponder module to outside the optical transponder module. The heat wick may be soldered to thermal vias in the printed circuit board that is internal to the optical transponder module and positioned over the laser transmitter circuitry. The copper block may be positioned in a cutout in the optical transponder module body to acts as a heat spreader. Thermal grease, compounds, paste, interface material, etc., may be used to help the conduction of heat.

11 Claims, 4 Drawing Sheets

OPTICAL TRANSPONDER WITH PASSIVE HEAT TRANSFER

BACKGROUND

1. Field

Embodiments of the present invention relate to telecommunication equipment and, in particular, to optical transponders.

2. Discussion of Related Art

Transponders may be used in telecommunication systems and/or networks to receive and transmit data and/or other information on optical and/or electrical signals. Traditional optical transponders have limitations however.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF EMBODIMENTS

Figure 1:
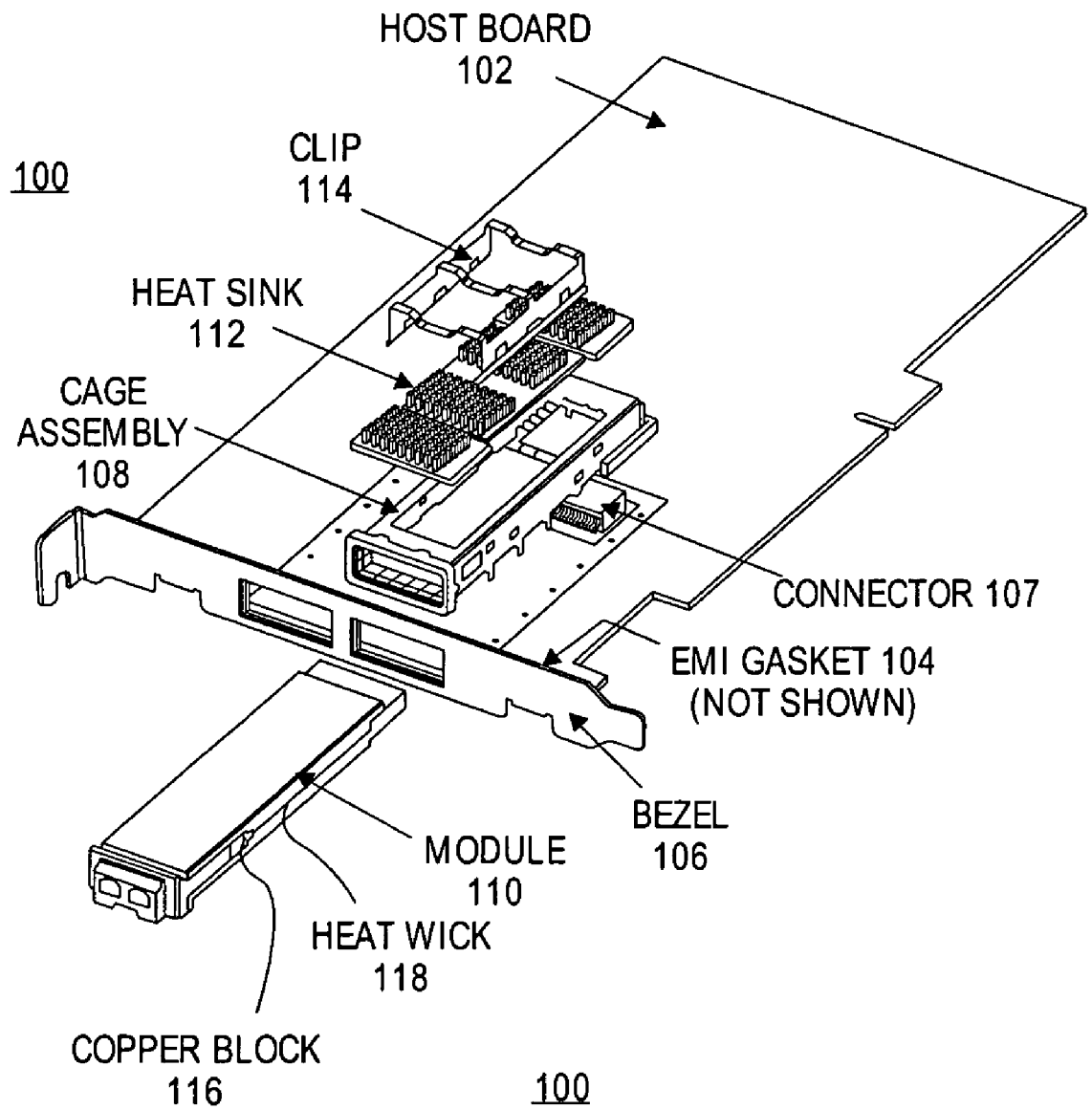
FIG. 1 is perspective view of an optical transponder assembly according to an embodiment of the present invention.

FIG. 1 is perspective view of mechanical component layout of an optical transponder assembly 100 according to an embodiment of the present invention. The illustrated example assembly 100 includes a host board 102 coupled to an electromagnetic interference (EMI) gasket 104. The EMI gasket is coupled to a bezel 106. When the optical transponder assembly 100 is assembled, a cage assembly 108 may be coupled to the host board 102 by way of a connector 107.

When the optical transponder assembly 100 is assembled, a transponder module 110 may be disposed inside the cage assembly 108 and also coupled to the host board 102 by way of the connector 107. When the optical transponder assembly 100 is assembled, a heat sink 112 may be removably coupled to the cage assembly 108 and/or the optical transponder module 110 using a clip 114. In the illustrated embodiment, the optical transponder assembly 100 also includes a heat conducting block 116 and a heat wick 118 disposed in the module 110.

Figure 2:
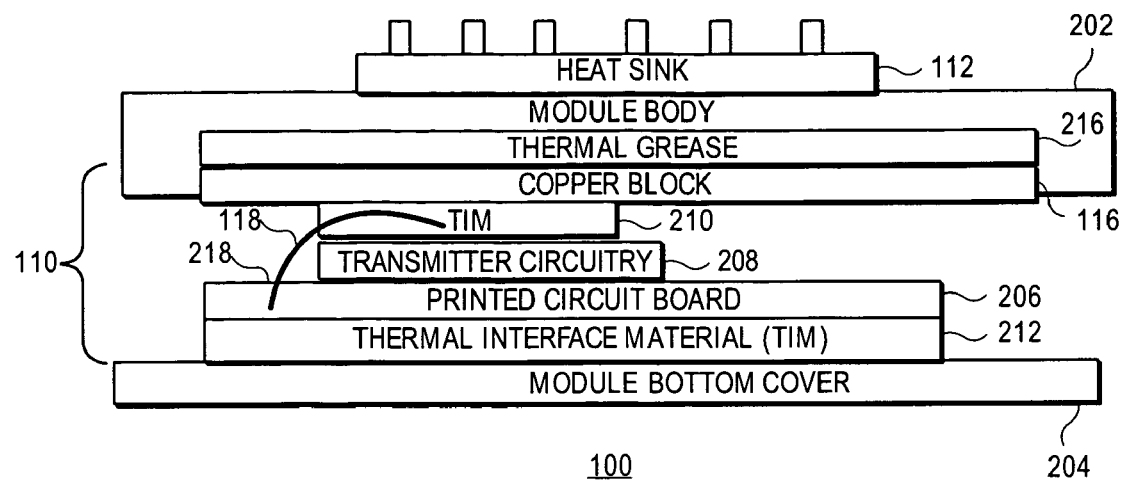
FIG. 2 is a cross-section view of the optical transponder assembly depicted in FIG. 1 in more detail according to an embodiment of the present invention.

FIG. 2 is a cross-section view of the module 110 and the heat sink 112 in more detail according to an embodiment of the present invention. In the illustrated embodiment, the module 110 is shown as having a module body 202 and a module bottom cover 204. A printed circuit board (PCB) 206 is disposed between the body 202 and the 204. Transmitter circuitry 208 for the transmitter portion of the optical transponder assembly 100 is coupled to the printed circuit board 206.

In the illustrated embodiment, thermal interface material (TIM) 210 is disposed between the transmitter circuitry 208 and the heat conductive block 116, and thermal interface material (TIM) 212 is disposed between the printed circuit board 206 and the bottom cover 204. In the illustrated embodiment, thermal grease 216 is disposed between the heat conductive block 116 and the body 202. In the illustrated embodiment, the heat wick 118 is disposed in one or more thermal vias 218 located on the PCB 206.

For some embodiments, the transmitter circuitry 208 includes circuitry to convert an electrical signal to an optical signal and to transmit the optical signal. The circuitry may include a laser, a laser driver, signal conditioning circuitry, such as clock and data recovery (CDR) circuitry, for example, amplifiers, one or more microcontrollers, a photodetector, and other circuitry. The printed circuit board 206 also may circuitry to receive an optical signal and to convert the optical signal to an electrical signal.

Figure 3:
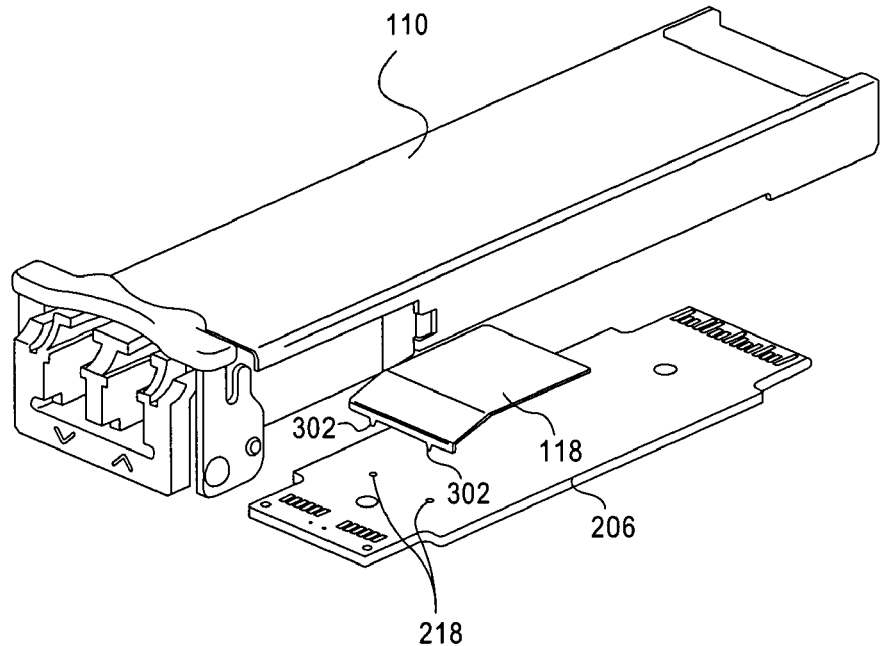
FIG. 3 is a perspective view of an unassembled optical transponder assembly and heat wick according to an embodiment of the present invention.

FIG. 3 is a perspective view of the optical transponder assembly 100 and the heat wick 118 unassembled according to an embodiment of the present invention. In the illustrated embodiment, the heat wick 118 is a piece of copper, made from sheet metal, for example.

The heat wick may act as a thermal heat spreader and/or heat bridge from the ground layer of the printed circuit board 206 to the outside surface of the optical transponder 100. For example, in some embodiments of the present invention the heat wick 118 may be capable of effectuating passive heat transfer utilizing air or other suitable means to transfer heat from the printed circuit board 206 to the module body 202.

For some embodiments, the heat wick 118 may be designed to transfer heat in substantially one direction from the printed circuit board 206 to the module body 202 and not from the module body 202 to the printed circuit board 206. Mathematical modeling may be used to ensure that unidirectional heat transfer is accomplished.

For some embodiments, one end of the copper heat wick 118 may be soldered to the printed circuit board 206 using the thermal vias 218, which may be tied to the copper ground layer, and the other end of the copper heat wick 118 may contact the inside surface of the module body 202 in a spring-like fashion or other mechanical means. Protrusions 302 may be inserted into the thermal vias 218 to aid in positioning the copper heat wick 118 in the thermal vias 218.

Heat generated in the optical transponder module 110 may be focused around the transmitter circuitry 208 and thus this area may be hotter than any other area in the module 110. Accordingly, the heat wick 118 may be disposed over the transmitter circuitry 208 area, as illustrated in FIG. 2.

Figure 4:
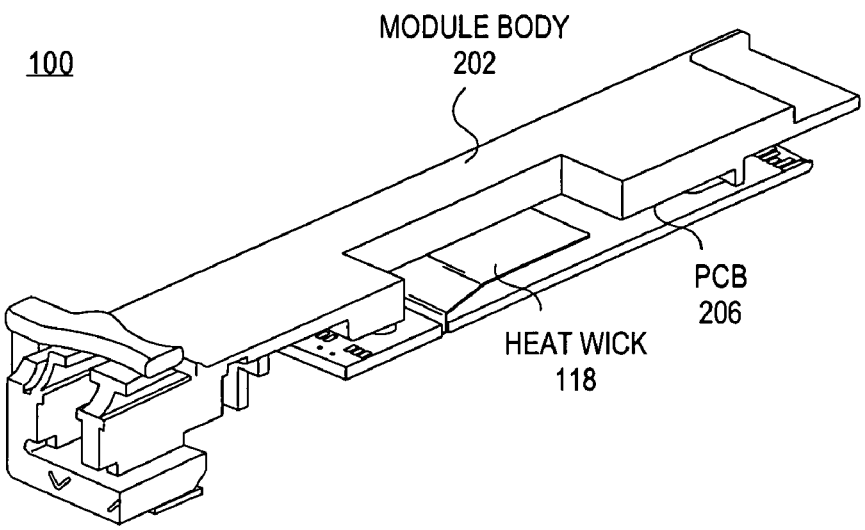
FIG. 4 is a perspective view of an assembled optical transponder assembly and heat wick according to an embodiment of the present invention.

FIG. 4 is a perspective view of the optical transponder assembly 100 and the heat wick 118 assembled according to an embodiment of the present invention. In the illustrated embodiment, the heat wick 118 is soldered to the printed circuit board 206 using the thermal via holes 218, which are tied to the ground layer of the printed circuit board 206. The copper heat wick 118 has sprung upward to contact the inside surface of the module body 202.

Figure 5:
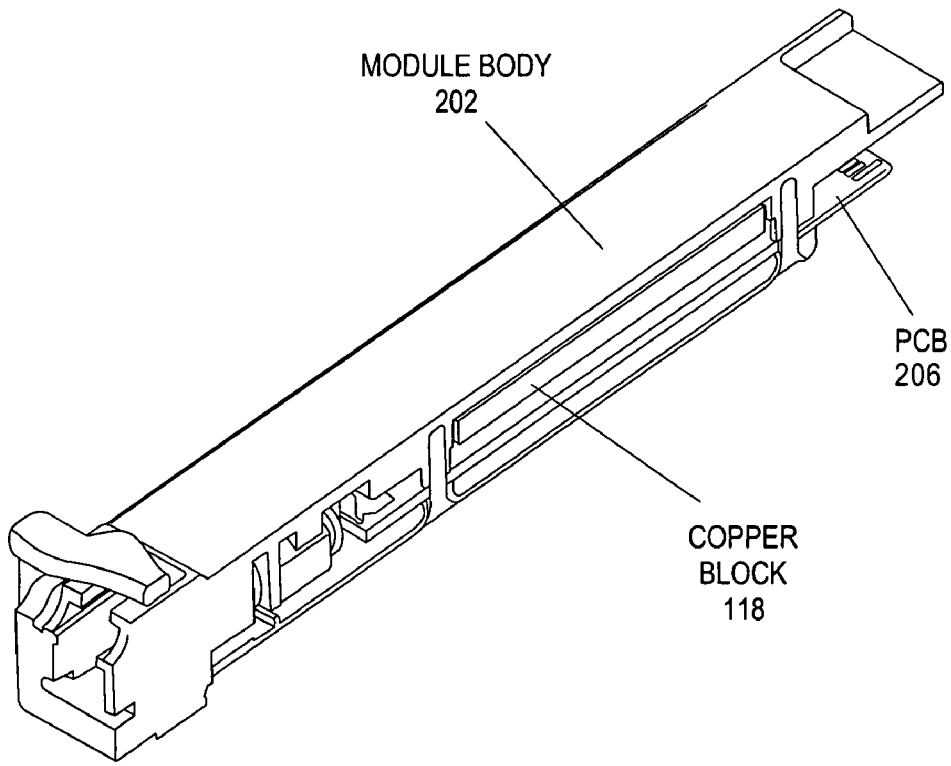
FIG. 5 is perspective view of an assembled optical transponder assembly and copper block according to an embodiment of the present invention.

FIG. 5 is a perspective view of the optical transponder assembly 100 and the heat conductive block 118 unassembled according to an embodiment of the present invention. In the illustrated embodiment, the heat conductive block 118 is a copper block disposed in a cutout of the body 202.

The heat conducting block 116 may act as a thermal heat spreader over a large surface area. For some embodiments, the body 202 may be machined to form the cutout and the heat conducting block 116 may be press-fitted into the cutout. The thickness of the heat conducting block 116 can be varied to be commensurate with the topography of the cutout.

For some embodiments, the heat conductive block 116 may be in direct contact with the module body 202 by means of mechanical attachment. This arrangement may enable localized heat to spread over the large surface area of the module body 202. For example, the heat conducting block 116 may effectuate passive heat transfer by utilizing air or other suitable means to transfer heat from the printed circuit board 206 to the module body 202. For some embodiments, heat conducting block 116 may be as large as can be accommodated in the module body 202.

For other embodiments, the thermal interface material 210 may be disposed between the transmitter circuitry 208 and the heat conductive block 118, to fill the airspace between the mating parts, for example.

Figure 6:
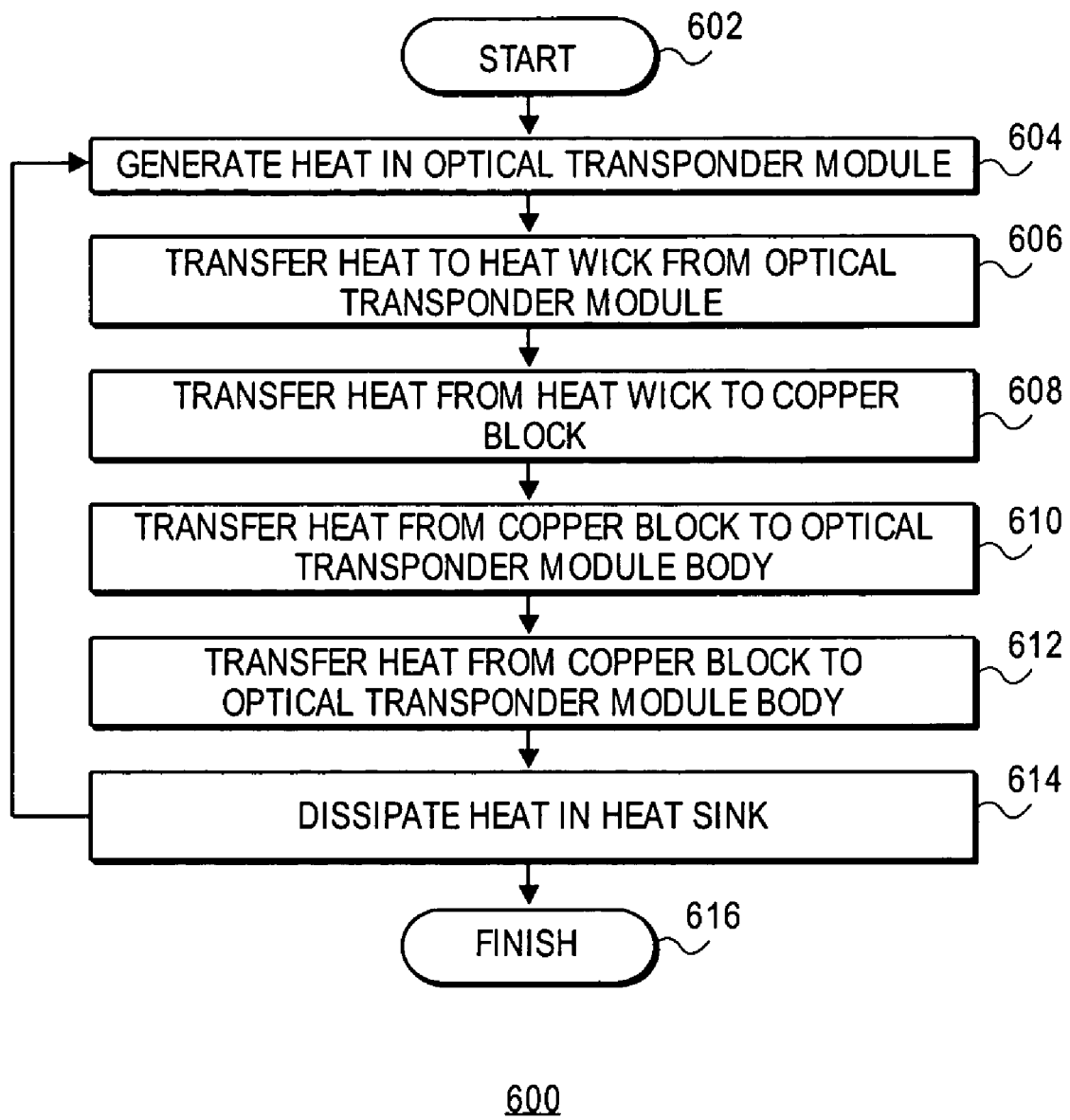
FIG. 6 is a flow chart illustrating a method for operating an optical transponder assembly according to an embodiment of the present invention.

FIG. 6 is a flow chart illustrating a method 600 for operating the optical transponder assembly 100 according to an embodiment of the present invention, in which the heat conductive block 116 and the heat wick 118 may be used to provide passive transfer of heat generated in the optical transponder assembly 100 to the atmosphere surrounding the optical transponder assembly 100.

The method 600 begins with a block 602, where control passes to a block 604.

In the block 604, the module 110 may generate heat. In one embodiment, the module 110 may generate heat as the components on the printed circuit board 206 operate.

In a block 606, heat may be transferred to the heat wick 118 from the printed circuit board 206. For some embodiments, heat may be transferred to the heat wick 118 from the ground layer in the printed circuit board 206.

In a block 608, heat may be transferred from the heat wick 118 to the heat conductive block 116, through the thermal interface material 210, for example.

In a block 610, heat may be transferred from heat conductive block 116 to the module body, through the thermal grease 216, for example.

In a block 612, heat may be transferred from the heat conductive block 116 to the heat sink 112.

In a block 614, the heat sink 112 may dissipate heat received from the heat conductive block 116.

The thermodynamic cycle in blocks 604–614 may repeat.

In a block 618, the method 600 finishes.

The operations of the method 600 have been described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented.

Of course, the method 600 is an example process and other processes may be used to implement embodiments of the present invention. A machine-accessible medium with machine-readable data thereon may be used to cause a machine, such as, for example, a processor (not shown) to perform the method 600.

In embodiments of the present invention, the host board 102 may be any suitable printed circuit board that may host one or more optical transponder modules 110.

In embodiments of the present invention, the EMI gasket 104 may be any suitable gasket capable of shielding electromagnetic interference (EMI) and/or radio frequency interference (RFI).

In embodiments of the present invention, the bezel 106 may be any suitable faceplate or cover for the host board 102.

In some embodiments of the present invention, the connector 107 may be a 30-pin connector. For other embodiments, the connector 107 may be a 70-pin connector.

In embodiments of the present invention, the cage assembly 108 may be any suitable housing that reduces electromagnetic interference (EMI) emissions and/or reduces susceptibility of the transponder module circuitry to radiation. In one embodiment, the cage assembly 108 may be a Faraday cage.

In embodiments of the present invention, the heat sink 112 may be capable of passively transferring heat from one place to another, such as, for example, using air flow.

In embodiments of the present invention, the clip 114 may be any device capable of removably securing the heat sink 112 to the module 110 and/or the cage 108.

In embodiments of the present invention, the thermal interface material (TIM) 210 and 212 may be any substance that helps the conduction of heat between the transmitter circuitry 208 and the heat conduction block 116. For other embodiments, the thermal interface material (TIM) 212 may be any substance that helps the conduction of heat between the module bottom cover 204 and the printed circuit board 206. For example, the thermal interface material (TIM) 210 and 212 may be thermal gap pads, thermal compounds, thermal grease, thermally conductive films, or other suitable thermal interface material.

For some embodiments of the present invention, the thermal grease 216 may be a used to promote better heating conduction between the heat conducting block 116 and the module body 202. Thermal paste and/or thermal compound also may be used to promote better heating conduction between the heat conducting block 116 and the module body 202.

Embodiments of the present invention may be implemented using hardware, software, or a combination thereof. In implementations using software, the software may be stored on a machine-accessible medium.

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:
   an optical transponder module having a body and a cover;
   a printed circuit board disposed in the optical transponder module body, the printed circuit board having circuitry to transmit and/or receive an optical signal;
   a copper block disposed in the optical transponder module body, the copper block to transfer heat from the printed circuit board to the module cover; and
   at least one copper sheet removably connected to a ground layer in the printed circuit board through a thermal via formed in the printed circuit board, the copper sheet forming a heat wick to transfer heat from the printed circuit board to the copper block.

2. The apparatus of claim 1, further comprising thermal interface material disposed between the copper sheet and the copper block, the thermal interface material to transfer heat from the copper sheet to the copper block.

3. The apparatus of claim 1, further comprising:
   a faraday cage, the module being disposed in the faraday cage; and
   a heat sink removably mounted to the faraday cage.

4. The apparatus of claim 1, wherein the copper block has a first thickness and a second thickness, the first thickness being different from the second thickness.

5. A method, comprising:
   generating heat in an optical transponder module, the optical transponder module to transmit and/or receive an optical signal;
   directing heat generated by the optical transponder module away from the optical transponder module using a copper heat wick disposed in the optical transponder module in proximity to a printed circuit board disposed in the optical transponder module using a thermal via disposed in the printed circuit board, wherein the copper heat wick is coupled to the thermal via; and
   directing heat from the copper heat wick to a copper block, the heat wick disposed between the printed circuit board and the copper block.

6. The method of claim 5, further comprising directing heat from the optical transponder module to a heat sink disposed on an outer surface of the optical transponder module.

7. A system, comprising:
   an optical transponder module;
   a printed circuit board disposed in the optical transponder module;
   a copper block embedded in the optical transponder module, the copper block to transfer heat from the printed circuit board to a body of the optical transponder module;
   at least one copper sheet removably connected to a ground layer in the printed circuit board through a thermal via formed in the printed circuit board, the copper sheet forming a heat wick to transfer heat from the printed circuit board to the copper block; and
   a seventy-pin connector coupled to the optical transponder module.

8. The system of claim 7, wherein the printed circuit board comprises circuitry to convert an electrical signal to an optical signal.

9. The system of claim 8, wherein the printed circuit board further comprises circuitry to transmit the optical signal.

10. The system of claim 7, wherein the printed circuit board comprises circuitry to receive an optical signal.

11. The system of claim 10, wherein the printed circuit board further comprises circuitry to convert the optical signal to an electrical signal.

* * * * *